(12) United States Patent
Aulbach

(10) Patent No.: US 6,513,828 B2
(45) Date of Patent: Feb. 4, 2003

(54) PASSENGER PROTECTION DEVICE FOR MOTOR VEHICLES

(75) Inventor: Alexander Aulbach, Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/983,595

(22) Filed: Oct. 25, 2001

(65) Prior Publication Data

US 2002/0050702 A1 May 2, 2002

(30) Foreign Application Priority Data

Oct. 25, 2000 (DE) .......................... 100 52 942

(51) Int. Cl.⁷ .............................................. B60R 21/20
(52) U.S. Cl. .................... 280/728.3; 280/730.2
(58) Field of Search ............. 280/730.2, 728.2, 280/730.1, 728.3, 732, 750

(56) References Cited

U.S. PATENT DOCUMENTS

| 5,799,971 A | 9/1998 | Asada |
| 5,906,395 A | 5/1999 | Isaji et al. |
| 5,924,724 A | 7/1999 | Nakamura et al. |
| 5,997,032 A | * 12/1999 | Miwa et al. ............. 280/730.1 |
| 6,089,594 A | * 7/2000 | Hasegawa et al. ....... 280/728.2 |

FOREIGN PATENT DOCUMENTS

| DE | 297 17 405 U1 | 12/1997 |
| DE | 199 15 831 A1 | 10/2000 |
| EP | 0 768 215 A2 | 4/1997 |
| EP | 07 68 216 A1 | 4/1997 |

\* cited by examiner

*Primary Examiner*—Paul N. Dickson
*Assistant Examiner*—Faye M. Fleming
(74) *Attorney, Agent, or Firm*—Foley & Lardner

(57) ABSTRACT

A safety device for a motor vehicles that includes an airbag module which can be integrated in a vehicle seat. The airbag module includes a premanufactured modular unit which can be handled as a cohesive whole and has an inflatable airbag that may serve as a side airbag. The modular unit further includes a gas generator and a structural element forming part of a back wall of the vehicle seat being designed at the same time as a module covering for the modular unit.

26 Claims, 1 Drawing Sheet

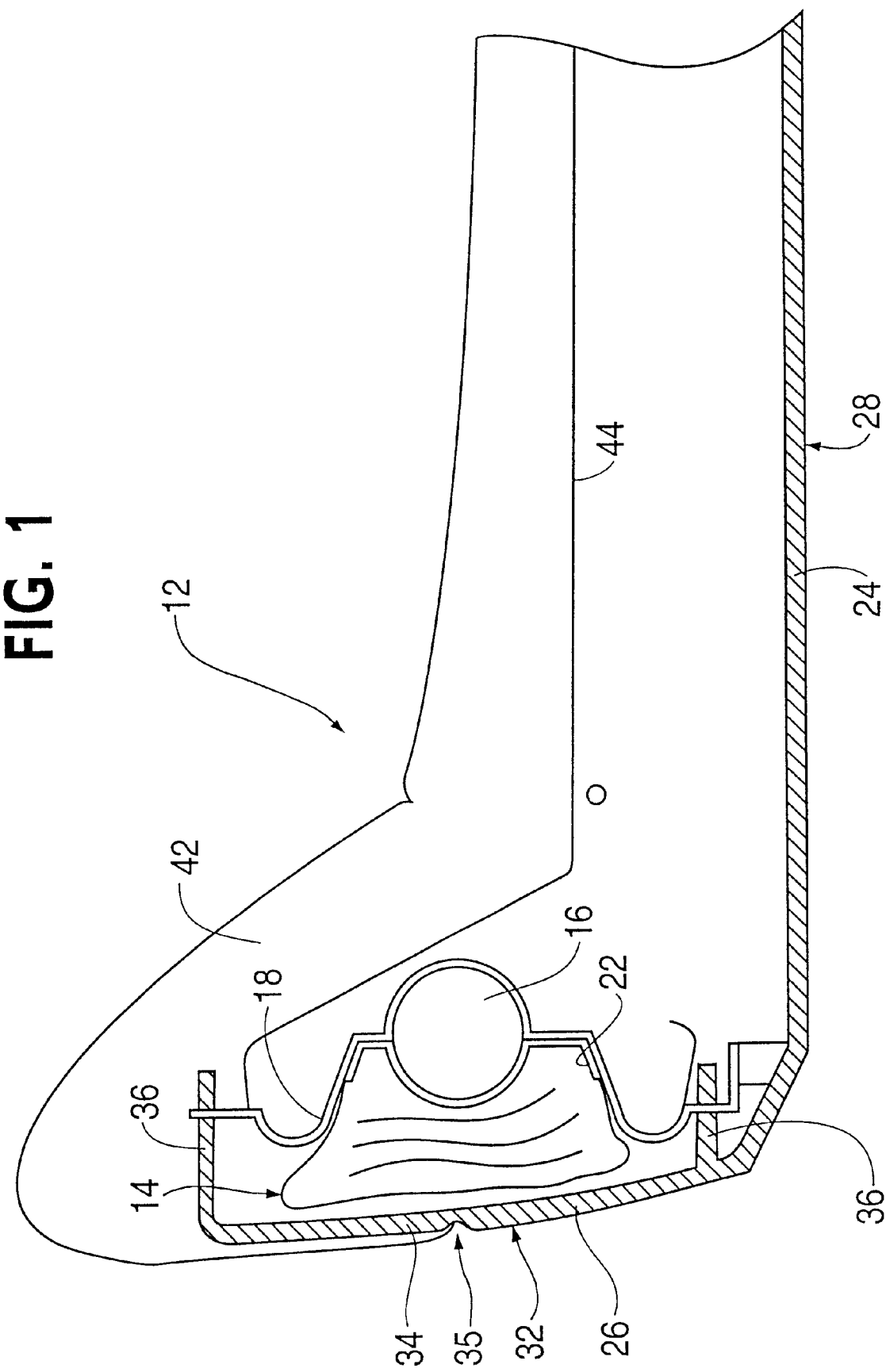

PASSENGER PROTECTION DEVICE FOR MOTOR VEHICLES

BACKGROUND OF THE INVENTION

The invention relates to a safety device for motor vehicles, having an airbag module which can be integrated in a vehicle seat and has an inflatable airbag serving, in particular, as a side airbag.

It is known in principle to integrate airbags in a vehicle seat. However, it remains a problem to provide a safety device having an integrated airbag module which may be constructed simply and fitted easily.

SUMMARY OF THE INVENTION

According to an embodiment of the present invention, a safety device for a motor vehicle is provided. The device includes an airbag module integrated in a vehicle seat and including a modular unit having an inflatable airbag configured as a side airbag. The modular unit includes a gas generator, and a cover. The cover includes a structural element forming part of a back wall of a vehicle seat.

According to an alternative embodiment of the present invention, a seat for a motor vehicle is provided. The seat includes a structural element which forms part of a back wall of the seat and an airbag module which can be integrated in the seat. The airbag module may include a premanufactured modular unit which can be handled as a cohesive whole and has an inflatable airbag serving, in particular, as a side airbag, and a gas generator, the structural element being designed at the same time as a module covering for the modular unit.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawing, which is briefly described below.

The FIGURE is a partial view of a horizontal cross-section of a vehicle seat provided with a safety device according to the invention.

DETAILED DESCRIPTION

According to the present invention an airbag module is provided. The module includes a premanufactured modular unit which can be handled as a cohesive whole and has an inflatable airbag, serving, in particular, as a side airbag, and a gas generator, a structural element forming part of a back wall of the vehicle seat being designed at the same time as a module covering for the modular unit.

The structural element provided according to the invention serves at the same time as part of the back wall of the vehicle seat and as a module covering for the modular unit. A separate covering element for the modular unit is therefore not required. According to the invention, the number of components required as a whole for the safety device is therefore reduced. This simplifies the construction of the safety device.

In addition, the invention facilitates the installation of the safety device, since when the structural element is attached to the vehicle seat, not only is part of the back wall of the seat fitted, but at the same time serves for the covering of the modular unit.

The premanufactured or assembled modular unit which can be handled as a cohesive whole can contain all of the essential components required for the functioning of the safety device, such as the airbag, the gas generator and the retaining and connecting elements which may be required. The component parts of the modular unit do not need to be dispersed or arranged in a spatially distributed manner. The airbag module is therefore formed by the modular unit and the structural element, the structural element acting as the covering for the modular unit. The structural element does not need to be designed as a securing means for dispersed component parts of the modular unit or to take on further functions in addition to the covering function. This makes possible a particularly simple construction of the structural element. Apart from the covering, which is taken on by the structural element when fitted, the modular unit is complete and fully functional prior to fitting.

In a preferred, practical embodiment of the invention, provision is made for the structural element to have a region which can be broken open, torn open, swiveled open and/or pivoted away by the inflating airbag and, in particular, for it to be provided with a predetermined breaking point.

The structural element may form the entire back wall of the vehicle seat. In particular, the structural element may be provided as the backrest covering of the vehicle seat.

The module covering preferably extends approximately perpendicular with respect to the backrest of the vehicle seat. This enables the structural element to serve as a covering for those modular units whose airbag, which serves as a side airbag, emerges from the side wall region of the vehicle seat in an accident.

In particular, the covering may be formed by a section of the structural element, which section forms at least part of a side wall of the vehicle seat. In this case, both a side wall and the back wall of the vehicle seat are partially formed by the structural element according to the invention.

It is preferred if the structural element can also be attached to the vehicle seat without a modular unit being fitted to the structural element or to the vehicle seat. This enables the structural element to be used even with those vehicle seats in which a modular unit is not to be integrated or, for example for space reasons, cannot be integrated.

A further design of the invention proposes that the modular unit can be pre-fitted to the structural element which is not yet attached to the vehicle seat. The installation of the safety device is simplified even further as a result. The structural element and the modular unit can be connected to each other at any desired location and then attached at a given time to the vehicle seat as a unit.

As an alternative, it is also possible to initially fit only the modular unit on the vehicle seat and to attach the structural element subsequently to the vehicle seat in order to cover the modular unit and install part of the back wall on the vehicle seat. In this case, the vehicle seat, the modular unit and the structural element may be designed in such a manner that either a joint or separate installation of the structural element and the modular unit on the vehicle seat is possible.

In a further embodiment of the invention, the structural element is of one-piece design. The structural element may, in particular, have a shell shape. A further alternative design of the invention includes providing the structural element with a section forming part of the back wall of the vehicle seat and a section forming the module covering extending approximately perpendicular with respect to each other.

According to a particularly preferred embodiment of the invention, the covering is designed in the form of a cap. In this connection; the covering preferably has a cover and side wall sections which extend approximately perpendicular with respect to the cover. The modular unit can be fastened to the side wall sections, while the cover can be designed, in some regions, such that it can, for example, be broken open, torn open, swiveled open and/or pivoted away, in order to enable deployment of the inflating airbag in an accident.

The modular unit preferably has a baseplate and can be attached to the structural element via the baseplate. The baseplate may be designed as a support for a gas generator and/or for an, in particular, annular retaining element of the airbag.

The invention also relates to a seat for motor vehicles, having a structural element which forms part of a back wall of the seat, and having an airbag module which can be integrated in the seat and comprises a premanufactured modular unit which can be handled as a cohesive whole and has an inflatable airbag serving, in particular, as a side airbag, and a gas generator, the structural element being designed at the same time as a module covering for the modular unit.

The vehicle seat 12 containing the safety device may be used, for example, as the driver's seat of a motor vehicle. The backrest includes a back wall 28, a side wall 32 and upholstery 42, which is supported on a substructure 44.

The back wall 28 and the side wall 32 are formed by a one-piece structural element 24, 26. The structural element has a plate-shaped section 24 forming the backrest covering of the seat 12, and a section 26 which is approximately perpendicular with respect to the backrest section 24 and therefore extends approximately parallel to a side wall (not shown) of the vehicle and is designed as a module covering 34, 36 for a modular unit described in greater detail below.

The module covering formed by the lateral section 26 of the structural element is designed in the form of a cap and comprises a cover 34 forming part of the side wall 32 of the vehicle seat 12, and side walls or side wall sections 36 extending approximately perpendicular with respect to the cover 34. The cover 34 has a region of relatively small wall thickness and a region of relatively great wall thickness, which regions are delimited from each other by a predetermined breaking point 35. In the region of relatively small wall thickness, the cover 34 and the upholstery 42 overlap one another.

The modular unit serving as a side airbag arrangement comprises an airbag 14 which is illustrated schematically in the figure in a folded-up state. Furthermore, the nodular unit has a cup-shaped baseplate 18, a gas generator 16 and an annular retaining element 22. The airbag 14 is wedged by its region, which bounds a gas-inlet opening, between the retaining element 22 and the baseplate 18. The modular unit is fastened to the side wall sections 36 of the module covering via radially outer sections of the baseplate 18 and in this manner is connected to the structural element 24, 26.

The predetermined breaking point 35 makes possible a defined breaking open, tearing open, swiveling open or pivoting away of the cover 34, or of the regions of different wall thickness forming the cover 34, by the expanding airbag 14, which is inflated by means of the gas generator 16 in the event of a crash.

The modular unit can be premanufactured and assembled independently of the vehicle seat 12 and, in particular, of the structural element 24, 26 and can be stored and transported as a cohesive whole or as a cohesive subassembly.

The modular unit may be pre-fitted to the structural element 24, 26 before the subassembly is attached to the vehicle seat 12 as a unit.

However, it is also possible to fit the modular unit to the vehicle seat 12, for example by fastening it to the substructure 44, before the structural element 24, 26 is attached to the vehicle seat 12.

Furthermore, the structural element 24, 26 is designed in such a manner that it can be fastened to the vehicle seat 12, for example to its substructure 44, without a modular unit having previously been fitted to the vehicle seat 12 or to the structural element 24, 26. The structural element 24, 26 can therefore also be used on vehicle seats 12 which are not provided with a modular unit.

The priority application, German Patent Application DE 100 52 942.9, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A safety device for a motor vehicle, comprising:
   an airbag module integrated in a vehicle seat and including a modular unit having an inflatable airbag configured as a side airbag, a gas generator, and a cover;
   wherein the cover comprises a structural element forming at least part of a back wall of a vehicle seat; and
   wherein the structural element is integral with the back wall of the vehicle seat and is formed with a predetermined breaking point in essentially a mid-point.

2. The device of claim 1, wherein the structural element is provided as the backrest covering of the vehicle seat.

3. The device of claim 1, wherein the cover extends substantially perpendicular with respect to the backrest of the vehicle seat.

4. The device of claim 1, wherein the cover is formed by a section of the structural element, and wherein the section forms at least part of a side wall of the vehicle seat.

5. The device of claim 1, wherein the structural element is configured to be attached to the vehicle seat without a modular unit being fitted to the structural element or to the vehicle seat.

6. The device of claim 1, wherein the modular unit is configured to be pre-fitted to the structural element prior to being attached to the vehicle seat.

7. The device of claim 1, wherein the structural element is of one-piece design.

8. The device of clam 1, wherein the structural element is shell-shaped design.

9. The device of claim 1, wherein the structural element comprises a first section forming part of the back wall of the vehicle seat and a second section forming the cover wherein the first and second sections extend approximately perpendicular with respect to each other.

10. The device of claim 1, wherein the cover is designed in the form of a cap.

11. The device of claim 10, wherein the cover has a cover section and a pair of and side wall sections wherein the cover section extends approximately perpendicular with respect to the side wall sections.

12. The device of claim 1, wherein the modular unit has a baseplate and is configured to be attached to the structural element via the baseplate.

13. The device of claim 12, wherein the baseplate is configured to be a support for the gas generator.

14. The device of claim 12, wherein the baseplate is configured to be a support for an annular retaining element of the airbag.

15. The device of claim 1, wherein the structural element includes a predetermined breaking point which can be broken open by the inflating airbag.

16. The device of claim 1, wherein the predetermined breakpoint is located essentially opposite the gas generator.

17. The device of claim 1, wherein the structural element is a unitarily formed element.

18. The device of claim 1, wherein the airbag module is connected to and supported by the structural element.

19. A seat for a motor vehicle, comprising:

a back wall formed by a structural element;

an airbag module integrated into the seat and including a modular unit having an inflatable side airbag and a gas generator;

wherein the modular unit is configured to be handled as a cohesive unit;

wherein the structural element serves as a cover for the modular unit; and wherein the structural element is integral with the back wall and has a predetermined breaking point therein.

20. The seat of claim 19, wherein the cover extends substantially perpendicular with respects the backrest of the vehicle seat.

21. The seat of claim 19, wherein the structural element forms part of a side wall of the vehicle seat.

22. The seat of claim 19, wherein the modular unit is configured to be prefitted to the structural element prior to being attached to the vehicle seat.

23. The seat of claim 19, wherein the structural element comprises a first section forming the back wall of the vehicle seat and a second section forming the cover wherein the first and second sections extend approximately perpendicular with respect to each other.

24. The device of claim 19, wherein the predetermined breakpoint is located essentially opposite the gas generator.

25. The device of claim 19, wherein the structural element is a unitarily formed element.

26. The device of claim 19, wherein the airbag module is connected to and supported by the structural element.

* * * * *

UNITED STATES PATENT AND TRADEMARK OFFICE
CERTIFICATE OF CORRECTION

PATENT NO. : 6,513,828 B2
DATED : February 04, 2003
INVENTOR(S) : Alexander Aulbach It is certified that error appears in the above-identified patent and that said Letters Patent is hereby corrected as shown below:

Title page,
Item [73], Assignee, please change "Takata-Petri AG" to -- Takata-Petri (Ulm) GmbH --

Signed and Sealed this

Twentieth Day of July, 2004

JON W. DUDAS
*Acting Director of the United States Patent and Trademark Office*